United States Patent Office 3,492,304
Patented Jan. 27, 1970

3,492,304
5,6,7,7a,8,8a,9,10,12,12a-DECAHYDRO-11H-BENZ[b] INDOLO[3,2,1-ij] 1,5 NAPHTHYRIDIN-11-ONES
John Shavel, Jr., Mendham, and Glenn C. Morrison, Dover, N.J., assignors to Warner-Lambert Pharmaceutical Company, Morris Plains, N.J., a corporation of Delaware
No Drawing. Filed June 24, 1968, Ser. No. 739,190
Int. Cl. C07d 57/06; A61b 27/00
U.S. Cl. 260—288
2 Claims

ABSTRACT OF THE DISCLOSURE

The present invention relates to new and novel 5,6,7,7a,8,8a,9,10,12,12a - decahydro - 11H - benz[b]indolo[3,2,1-ij][1,5]naphthyridin-11-ones having the formula:

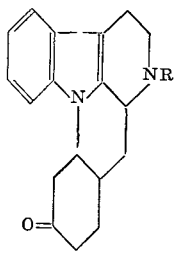

wherein R is lower alkyl. The compounds of this invention are useful as central nervous system stimulants.

---

This invention relates to new and useful heterocyclic compounds and relates more particularly to new and novel 5,6,7,7a,8,8a,9,10,12,12a - decahydro-11H-benz[b] indolo[3,2,1-ij][1,5]naphthyridin - 11 - ones having the formula:

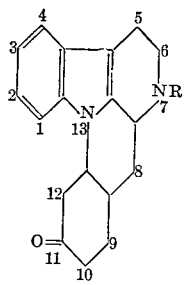

where R=lower alkyl such as methyl, ethyl, isobutyl and the like.

The symbol R as used hereinafter has the meaning described above.

Also embraced within the scope of this invention are the pharmaceutically accepted acid addition salts of the above described bases, their quaternary ammonium salts and N-oxides.

This invention also includes within its scope a new and novel process for preparing the above compounds as well as the intermediates employed for their synthesis.

The compounds of this invention are useful as central nervous system stimulants in mammals such as mice, dogs, cats and the like.

In order to use these compounds as central nervous system stimulants, these compounds are administered at a dose of about 100 mg./kg. of the mammalian body weight. This dosage regimen can be repeated up to 3 times daily.

A condition for which these compounds are indicated is, for example, mild depressive states whereby the stimulant effects of these compounds help to restore optimism and a sense of well being.

In order to administer these compounds, they may be combined with an inert pharmaceutical excipient such as lactose, mannitol, dicalcium phosphate, and compounded into dosage forms such as tablets, capsules, according to well known pharmacist's art. These compounds may also be formulated into dosage forms suitable for parenteral administration. These parenteral dosage forms are compounded by dissolving or suspending the active ingredient in a parenterally acceptable vehicle such as water, oil, or isotonic saline.

In addition they are valuable intermediates in the production of other compounds of the 5,6,7,7a,8,8a,9,10, 12,12a - decahydro - 11H - benz[b]indolo[3,2,1-ij][1,5] naphthyridin-11-ones.

The compounds of this invention are prepared by reacting p-methoxyacetic acid of the formula:

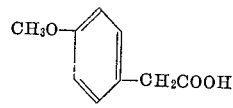

(1)

with tryptamine of the formula:

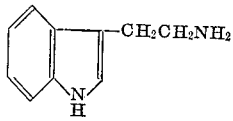

(2)

to form an amide of the formula:

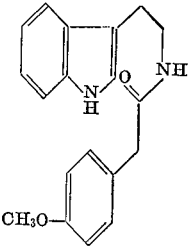

(3)

This reaction is carried out by heating the acid and amine at an elevated temperature such as 185°.

Treatment of the amide 3 with a cyclodehydration agent such as phosphorous oxychloride or phosphorous pentoxide gives a dihydro-β-carboline of the formula:

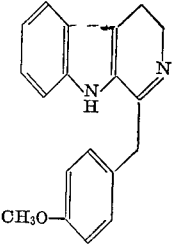

(4)

Reduction of the 4 with an alkali metal borohydride such as sodium borohydride affords a tetrahydro-β-carboline of the formula:

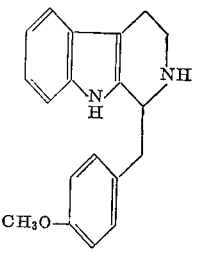

(5)

Treatment of 5 with an alkali metal such as sodium and an aliphatic alcohol such as t-butanol in liquid ammoni produces a dihydrobenzene of the formula:

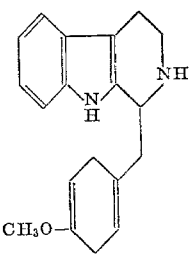

(6)

On refluxing 6 in an ethyl ester and ethanol there is obtained an acylketal of the formula:

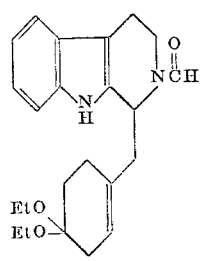

(7)

Reduction of 7 with lithium aluminum hydride produces a lower alkyl derivative of the formula:

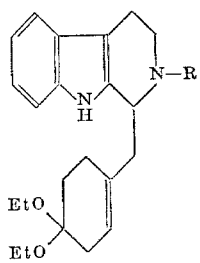

(8)

Treatment of compound 8 with a mineral acid such as hydrochloric acid in an alcohol such as methanol gives two stereoisomers of the 5,6,7,7a,8,8a,9,10,12,12a-decahydro - 11H - benz[b]indolo[2,2,1 - ij][1,5]naphthyridin-11-ones.

The compounds of our invention may be converted into their pharmaceutically acceptable non-toxic acid addition and quaternary ammonium salts by conventional procedures. Exemplary of non-toxic acid addition salts are those formed with acetic maleic fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride, or a reactive ester such as methyl sulfate, ethyl sulfate, or methyl p-toluenesulfonate.

The N-oxides of these compounds are prepared by treating the free base with an oxidizing agent such as, for example, hydrogen peroxide.

The following examples are included in order to further illustrate the invention.

EXAMPLE 1

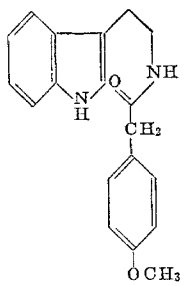

N-(2-indol-3-ylethyl)-2-(p-methoxyphenyl)acetamide

A mixture of 49.8 g. of p-methoxyphenylacetic acid and 48 g. of tryptamine was heated at 180–185° for 6 hrs. Crystallization of the reaction mixture from 2.5 l. of ethyl acetate gave 77 g. (84%) of a crystalline solid, M.P. 151.5–152.5°.

*Analysis.*—Calcd. for $C_{19}H_{20}N_2O_2$: C, 74.00; H, 6.54; N, 9.09. Found: C, 73.75; H, 6.30; N, 9.33.

EXAMPLE 2

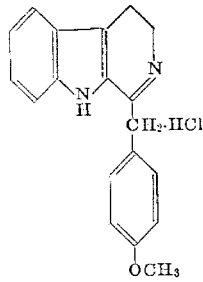

4,9-dihydro-1-(p-methoxybenzyl)3H-pyrido[3,4-b]indole

A solution of 83 g. of N-(2-indol-3-ylethyl)-2-(p-methoxyphenyl)acetamide in 425 ml. of phosphorous oxychloride was heated at 70° for 6 hrs. The reaction mixture was poured into 3 l. of ether. The precipitate on crystallization from 400 ml. of ethanol gave 52 g. (59%), of a solid, M.P. 238–239°. Further recrystallization gave an analytical sample, M.P. 235–235.5°.

*Analysis.*—Calcd. for $C_{19}H_{19}ClN_2O$: C, 69.83; H, 5.86; N, 8.57; Cl, 10.85. Found: C, 69.72; H, 6.08; N, 8.32; Cl, 10.66.

EXAMPLE 3

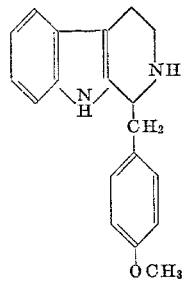

2,3,4,9-tetrahydro-1-(p-methoxybenzyl)-1H-pyrido[3,4-b]indole

To a solution of 41 g. of 4,9-dihydro-1-(p-methoxybenzyl)-3H-pyrido[3,4-b]indole hydrochloride in 200 ml. of water and 200 ml. of methanol was added 4.0 g. of sodium borohydride while the temperature was held below 40°. After the addition had been completed stirring was continued for an additional 10 minutes. The reaction mixture was diluted with 800 ml. of water, made basic with 100 ml. of 10% sodium hydroxide solution, and was extracted with methylene chloride. The methylene chloride layer was washed with water, dried over sodium sulfate, and the solvent was removed. Crystallization of the residue from benzene Skellysolve B gave 27 g. (72%) of a solid, M.P. 110–112°. Further recrystallization gave an analytical sample, M.P. 111–112°.

*Analysis.*—Calcd. for $C_{19}H_{20}N_2O$: C, 78.05; H, 6.90; N, 9.58. Found: C, 78.06; H, 6.89; N, 9.59.

The *hydrochloride* formed in methanol as a crystalline solid, M.P. 256–258°. Further recrystallization gave an analytical sample, M.P. 257–258°.

*Analysis.*—Calcd. for $C_{19}H_{21}ClN_2O$: C, 69.40; H, 6.44; N, 8.52; Cl, 10.78. Found: C, 69.70; H, 6.56; N, 8.68; Cl, 10.73.

EXAMPLE 4

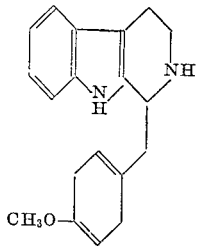

2,3,4,9-tetrahydro-1-[(4-methoxy-1,4-cyclohexadien-1-yl)methyl]-1H-pyrido[3,4-b]indole To a solution of 17.0 g. of 2,3,4,9-tetrahydro-1-(p-methoxybenzyl)-1H-pyrido[3,4-b]indole in 400 ml. of tetrahydrofuran 800 ml. of ammonia was added. Over a 2 hr. interval 8 g. of sodium and 34 ml. of t-butanol were added alternately in six equal portions and then stirring was continued for an additional 3 hrs. The remaining sodium was destroyed by the addition of 2 ml. of methanol and the solvents removed. The residue was treated with 400 ml. of hot benzene, the solution filtered, and the solvent was removed. Crystallization of the residue from 50 ml. of ethyl acetate gave 6.1 g. (35%) of a solid, M.P. 137–137.5°. Another recrystallization gave an analytical sample, M.P. 137.5–138°.

*Analysis.*—Calcd. for $C_{19}H_{22}N_2O$: C, 77.52; H, 7.53; N, 9.52. Found: C, 77.51; H, 7.49; N, 9.36.

EXAMPLE 5

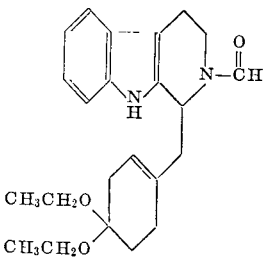

1-[4,4-diethoxy-1-cyclohexen-1-yl)methyl]-2,3,4,9-tetrahydro-1H-pyrido[3,4-b]indole-2-carboxaldehyde A mixture of 3.0 g. of 2,3,4,9-tetrahydro-1-[(4-methoxy - 1,4 - cyclohexadien - 1 - yl)methyl] - 1H - pyrido [3,4-b]indole, 75 ml. of ethyl formate and 300 ml. of ethanol was refluxed for 48 hrs. The reaction mixture was evaporated to dryness in vacuo and the residue chromatographed on alumina. Elution with ether gave 2.4 g. of an oil. Crystallization from ether afforded 1.8 g. (54%) of a solid, M.P. 153.5–154.5°. Recrystallization from ethanol gave an analytical sample, M.P. 156–157°.

*Analysis.*—Calcd. for $C_{23}H_{30}N_2O_3$: C, 72.22; H, 7.91; N, 7.32. Found: C, 72.41; H, 7.91; N, 7.44.

EXAMPLE 6

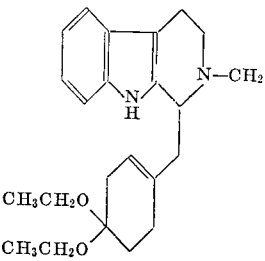

1-[(4,4-diethoxy-1-cyclohexen-1-yl)methyl]-2,3,4,9-tetrahydro-2-methyl-1H-pyrido[3,4-b]indole To a slurry of 4.5 g. of lithium aluminum hydride in 300 ml. of tetrahydrofuran was added a solution of 11.5 g. of 1 - [(4,4 - diethoxy - 1 - cyclohexen - 1 - yl) methyl] - 2,3,4,9 - tetrahydro - 1H - pyrido[3,4-b]indole-2-carboxaldehyde in 250 ml. of tetrahydrofuran and the mixture stirred for 10 hrs. The reaction mixture was decomposed with 40% sodium hydroxide, filtered, and the solvent removed. Crystallization of the residue from isopropyl ether gave 5.0 g. (46%) of a solid, M.P. 94–99°. Another recrystallization gave an analytical sample, M.P. 98–99°.

*Analysis.*—Calcd. for $C_{23}H_{32}N_2O_2$: C, 74.96; H, 8.75; N, 7.60. Found: C, 74.70; H, 8.78; N, 6.66.

EXAMPLE 7

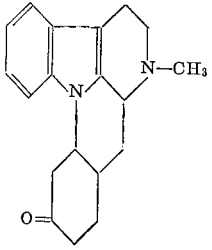

Cyclization of 1-[(4,4-diethoxy - 1 - cyclohexene-1-yl) methyl] - 2,3,4,9-tetrahydro-2-methyl-1H-pyrido[3,4-b] indole A solution of 19 g. of 1-[(4,4-diethoxy-1-cyclohexen-1-yl)methyl]-2,3,4,9-tetrahydro - 2 - methyl-1H-pyrido[3,4-b]indole and 150 ml. of hydrochloric acid in 300 ml. of methanol was refluxed for 2 hrs. The methanol was removed in vacuo and 500 ml. of water was added. The solution was made basic with 40% sodium hydroxide solution and extracted with methylene chloride. The methylene chloride layer was washed with water, dried over sodium sulfate, and the solvent was removed. The residue (16 g.) was chromatographed on 600 g. of alumina. Elution with benzene-methylene chloride (1:1) gave, after crystallization from cyclohexane, 4.0 g. (26%) of cis syn-5,6,7,7a,8,8a,9,10,12,12a-decahydro - 7 - methyl-11H-benz[b]indolo[3,2,1 - ij] [1,5]naphthylridin-11-one, M.P. 137.5–138.5°. Further recrystallization gave an analytical sample, M.P. 138.5–139°.

*Analysis.*—Calcd. for $C_{19}H_{22}N_2O$: C, 77.52; H, 7.53; N, 9.52. Found: C, 77.76; H, 7.50; N, 9.52.

Elution with methylene chloride gave, after crystallization from ether, 0.26 g. (1%) of a solid, M.P. 172–173°. Recrystallization from benzene-Skellysolve B gave an analytical sample of another isomer, M.P. 196.5–197°.

*Analysis.*—Calcd. for $C_{19}H_{22}N_2O$: C, 77.52; H, 7.53; N, 9.52. Found: C, 77.50; H, 7.59; N, 9.69.

It is understood that the foregoing detailed description is given merely by way of illustration and that many variations may be made therein without departing from the spirit of our invention.

Having described our invention, what we desire to secure by Letters Patent is:

1. A free base of the formula:

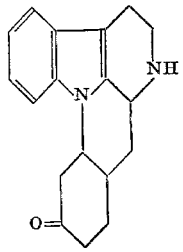

wherein R is lower alkyl, and the corresponding pharmaceutically acceptable acid addition salts, and the N-oxides thereof.

2. A compound of claim 1 which is cis syn-5,6,7,7a,8,8a,9,10,12,12a-decahydro-7-methyl - 11H - benz[b]indolo [3,2,1-ij] [1,5]naphthyridin-11-one.

References Cited

UNITED STATES PATENTS

| 3,326,923 | 6/1967 | Shavel et al. | 260—288 |
| 3,395,152 | 7/1968 | Shavel et al. | 260—288 |
| 3,401,170 | 9/1968 | Shavel et al. | 260—288 |

HENRY R. JILES, Primary Examiner

A. L. ROTMAN, Assistant Examiner

U.S. Cl. X.R.

260—326.13, 286, 295, 296; 424—258